US009989677B2

(12) United States Patent
Shalaev et al.

(10) Patent No.: US 9,989,677 B2
(45) Date of Patent: Jun. 5, 2018

(54) ULTRA-THIN, PLANAR, PLASMONIC METADEVICES

(71) Applicant: Purdue Research Foundation, West Lafayette, IN (US)

(72) Inventors: Vladimir Shalaev, West Lafayette, IN (US); Alexander Kildishev, West Lafayette, IN (US); Xingjie Ni, West Lafayette, IN (US); Satoshi Ishii, Hyogo (JP)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 243 days.

(21) Appl. No.: 14/427,052

(22) PCT Filed: Sep. 4, 2013

(86) PCT No.: PCT/US2013/057938
§ 371 (c)(1),
(2) Date: Mar. 10, 2015

(87) PCT Pub. No.: WO2014/039487
PCT Pub. Date: Mar. 13, 2014

(65) Prior Publication Data
US 2015/0309218 A1    Oct. 29, 2015

Related U.S. Application Data

(60) Provisional application No. 61/696,643, filed on Sep. 4, 2012, provisional application No. 61/722,669, filed on Nov. 5, 2012.

(51) Int. Cl.
*G02F 1/03* (2006.01)
*G02B 26/00* (2006.01)
(Continued)

(52) U.S. Cl.
CPC ............. *G02B 5/008* (2013.01); *G02B 1/002* (2013.01); *B82Y 20/00* (2013.01); *Y10S 977/834* (2013.01)

(58) Field of Classification Search
CPC .......... B82Y 20/00; B82Y 15/00; G02B 5/23; G02B 26/001; G02B 21/244;
(Continued)

(56) References Cited

U.S. PATENT DOCUMENTS

2005/0161589 A1* 7/2005 Kim ....................... B82Y 20/00
                                                          250/216
2005/0233493 A1* 10/2005 Augusto, Jr. .......... G02B 1/005
                                                           438/51
(Continued)

OTHER PUBLICATIONS

Genevet, P., et al., Ultra-thin plasmonic optical vortex plate based on phase discontinuities. Applied Physics Letters, 100, Jan. 31, 2001 (2012); doi: 10.1063/1.3673334.
(Continued)

*Primary Examiner* — Dawayne A Pinkney
(74) *Attorney, Agent, or Firm* — Purdue Research Foundation (57) ABSTRACT

An ultra-thin planar device is used for arbitrary waveform formation on a micrometer scale, regardless of the incident light's polarization. Patterned perforations are made in a 30 nm-thick metal film, creating discrete phase shifts and forming a desired wavefront of cross-polarized, scattered light. The signal-to-noise ratio of these devices is at least one order of magnitude higher than current metallic nano-antenna designs. The focal length of a lens built on such principle can also be adjusted by changing the wavelength of the incident light. All proposed embodiments can be embedded, for example, on a chip or at the end of an optical fiber.

21 Claims, 6 Drawing Sheets

(51) Int. Cl.
*G02F 1/33* (2006.01)
*H01L 29/06* (2006.01)
*H04J 14/00* (2006.01)
*G02B 5/00* (2006.01)
*G02B 1/00* (2006.01)
*B82Y 20/00* (2011.01)

(58) Field of Classification Search
CPC .......... G02F 1/0123; G02F 1/293; G02F 1/33; G03C 1/49881; G01P 15/0802; H01J 37/28; B21D 53/00; H01L 29/0657; H01L 2924/01079; H01L 33/32; H01S 1/02; H01S 5/026; H01S 5/50; H01S 3/225; H01S 3/0625; H01S 5/141; H01S 3/107; G01N 31/22; G01N 21/8483; B01L 2400/0406; B01L 2300/0829; H01F 17/0013
USPC ....... 359/241, 237–240, 299, 310, 321, 342, 359/248, 344–345; 436/164–165; 29/602.1, 417, 846; 422/82.05, 400, 407; 372/20, 28, 44.01, 50.1, 55; 250/201.3, 250/216, 306; 430/2, 21; 257/17, 21, 79, 257/417, 622
See application file for complete search history.

(56) References Cited

U.S. PATENT DOCUMENTS

2010/0256016 A1* 10/2010 Blair .................. B82Y 15/00
506/13
2014/0327909 A1* 11/2014 Kall .................. G01N 21/554
356/327

OTHER PUBLICATIONS

Sun, S., et al., Gradient-index meta-surfaces as a bridge linking propagating waves and surface waves. Nature Materials, Published Online: Apr. 1, 2012 | DOI: 10.1038/NMAT3292.
Ni, X., et al., Ultra-thin, planar, Babinet-inverted plasmonic metalenses. Light: Science & Applications (2013) 2, e72; doi:10.1038/lsa.2013.28.
Ni, X., et al., Broadband Light Bending with Plasmonic Nanoantennas. Science, 2012, vol. 335, 427.
Aieta, F., et al., Aberration-Free Ultrathin Flat Lenses and Axicons at Telecom Wavelengths Based on Plasmonic Metasurfaces. Nano Lett. 2012, 12, 4932-4936.
Larouche, S., et al., Infrared metamaterial phase holograms. Nature Materials, 2012, vol. 11, 450-454. Published Online: Mar. 18, 2012 | DOI: 10.1038/NMAT3278.
Yu, N., et al., Light Propagation with Phase Discontinuities: Generalized Laws of Reflection and Refraction. Science 2011, vol. 334, 333-337.

* cited by examiner

ULTRA-THIN, PLANAR, PLASMONIC METADEVICES

CROSS-REFERENCE TO RELATED APPLICATIONS

This patent application claims priority to, and incorporates fully by reference, and is a U.S. § 371 national stage entry of, International Patent Application Serial No. PCT/US2013/57938 filed Sep. 4, 2013 which is related to and claims priority to U.S. Provisional Patent Application No. 61/696,643, filed Sep. 4, 2012, and U.S. Provisional Patent Application No. 61/722,669, filed Nov. 5, 2012. All of the above applications are incorporated by reference in their entirety.

STATEMENT REGARDING FEDERALLY SPONSORED RESEARCH

This invention was made with government support under N00014-10-1-0942 awarded by Navy Office of Naval Research; FA9550-12-1-0024 awarded by United States Air Force Office of Scientific Research; DMR1120923 awarded by National Science Foundation, and UES-875-060-001 awarded by United States Air Force Research Laboratory. The government has certain rights in the invention.

FIELD OF THE INVENTION

This invention relates to planar devices for arbitrary waveform formation and in particular to those devices used in compact optical systems and other micro-scale technologies.

BACKGROUND OF THE INVENTION

The convergence or divergence of an optical beam in a traditional, refraction-based device depends on the phase change of the light propagating inside the device. The strength of the light bending in such a system is therefore limited by the refractive index of a given dielectric. Fabrication challenges are also paramount, as it is very difficult to make devices with a large aperture and a short focal length. By using the Fresnel lens design, the mass and volume of material can be reduced, but the thickness of the device is still on the wavelength scale. Fresnel zone plates, which consist of concentric rings (Fresnel zones) and use diffraction instead of refraction or reflection, also can be used to focus or diffract light, but it is impossible to shrink the size down to only a few wavelengths since the radius differences between the neighboring opaque and transparent rings must be at least half of the wavelength of the incident light, and typically a large number of rings is required for good performance.

Advances in the area of plasmonics have now opened up a new era for building compact, planar lenses. A number of plasmonic lenses have been developed recently based on super-oscillation and mode-index manipulation of guided waves inside nano-apertures (i.e. slits or holes). Nevertheless, those designs suffer from limited phase control, which restricts their minimum sizes and thicknesses: either the size of the device cannot be further reduced because the design is based on the diffraction of the light through transparent/opaque regions, or the thickness of the device must be comparable to the operational wavelength because the phase change is obtained by light propagating inside the lens material.

In the last few years, subwavelength-sized plasmonic nano-antennas on a planar surface have been shown to create phase shifts covering the full range (from 0 to $2\pi$) in cross-polarized scattered light due to their asymmetric plasmonic resonances. An array of such nanoantennas can form a metasurface to bend the light abnormally in a fairly broad range of wavelengths and can create, for example, an optical vortex beam. In addition, a metasurface arranged of plasmonic nano-antennas can be used as a very efficient coupler between propagating waves and surface waves. The design of these phase-shifting, plasmonic nano-antennas also can be used to build optical devices, including but not limited to lenses, with surprising properties.

SUMMARY OF THE INVENTION

An ultra-thin planar plasmonic device for changing the phase and magnitude of incoming radiation. The device is comprised of openings which are milled into a thin metal film of a thickness less than the wavelength of the incident light. This metal is usually gold, but it can also be silver or aluminum, materials which are especially beneficial for causing less background noise when focusing or diffracting incident light of shorter wavelengths. Other potential materials include silicon carbide, graphene, and other polaritonic materials. The openings form arrays, or patterns, of differently shaped holes which correspond to specific light-bending characteristics experienced by light that travels through each hole. The pattern can be circular and concentric or non-symmetrical, for example, but each device design ultimately depends on the specific technological application and desired emitted result.

The openings within each device are designed such that the polarization (either x- or y-) does not affect the focusing or diffracting ability or properties of the device, allowing each device to be polarization-independent. Additionally, the focal length of each device can be controlled by adjusting the wavelength of the incident light. In general, however, the focal length of the device is between one and fifteen micrometers, allowing for the focusing or diffracting of incident light in very small areas.

BRIEF DESCRIPTION OF THE DRAWINGS

FIG. 6 shows the experimental and simulated results for sample C (see Table 1 below) at an incident wavelength of (a) 531 nm, and (b) 476 nm (a1), (a2), (b1), and (b2) show cross-polarized light intensity distributions on the transmission side reconstructed from experimental measurements. (a3), (a4), (b3), and (b4) show simulated results under the same conditions. (a1), (a3), (b1), and (b3) show intensity distributions for two cross-sectional planes cutting through the center of the metalens. (a2), (a4), (b2), and (b4) show intensity distribution at the respective focal planes (a: z=9 μm, b: z=10 μm). The x-y planes in (a1) and (b1) are at z=0 μm. The x-y planes in (a3) and (b3) are at z=0.1 μm (avoiding the singularity at z=0 μm in the simulations). The effect of the depth of focus of the objective device has been taken into account in the simulations by averaging the intensity data in the z-direction within a 0.5-μm window.

Although the Figures herein depict only a focusing device, diffracting device experiments have also been performed, employing similar principles in order to create hologram images (See U.S. Provisional Patent No. 61/722, 669, filed Nov. 5, 2012, "Visible Phase Holograms Using Plasmonic Metasurfaces," by the same entity and inventors).

DETAILED DESCRIPTION OF THE PREFERRED EMBODIMENT

In contrast to conventional nano-antennas, the presently claimed device and method employ an inverted design built on Babinet's principle. That is, instead of metallic nano-antennas the claimed invention uses a set of similarly shaped nano-voids (Babinet-inverted, or complementary, nanoantennas) milled, or perforated, in a thin metallic film. Such a design provides a significantly higher signal-to-noise ratio. The nano-voids are arranged in arrays, or patterns, to create a planar plasmonic metadevice in order to much more efficiently focus or diffract (i.e. change the phase and the magnitude of) the incident light. In contrast to the near-IR device with focusing distances on the centimeter scale, the presently claimed plasmonic metadevices are very small in size (a few micrometers). Additionally, the present metadevices have an extremely strong focusing ability, with focal lengths of only a few micrometers and very large effective numerical apertures (NAs). Additionally, the metadevices can, using the same principles taught herein, be designed to diffract light, thus forming holograms of images. The claimed metadevices and method work across the entire visible spectral range and can spatially separate light at different wavelengths within small, micrometer-scale areas.

Figure 1:
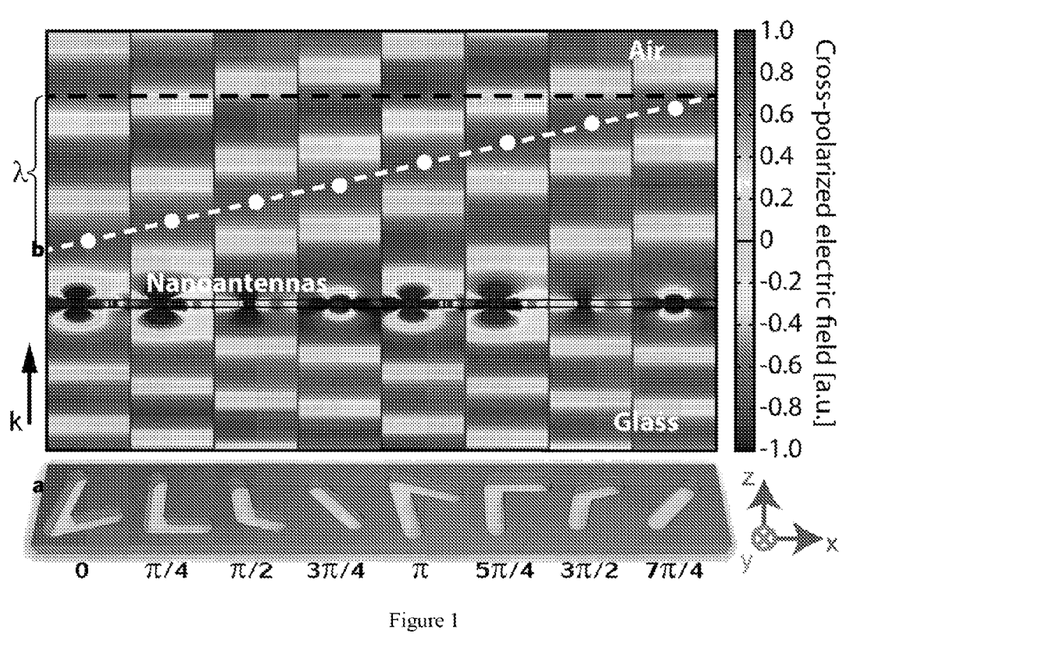
FIG. 1 shows (A) the schematic designs and (B) the results of full-wave simulations of individual Babinet-inverted nano-antennas (i.e. nanovoids) at a wavelength of 676 nm. The Babinet-inverted nano-antennas create discrete phase shifts from 0 to $7\pi/4$ for cross-polarized light. The linearly-polarized light enters the system from the glass substrate side of the sample. The pseudo-color field map indicates the cross-polarized light scattered from each nanovoid, clearly revealing the discrete phase shifts.

The presently claimed metadevices are comprised of an array of different shapes of nanovoids in a thin metallic film. The shape of each of the complementary nano-antennas provides a specific, discrete phase shift to the cross-polarized scattered light (that is, the scattered polarization is perpendicular to the incident polarization). The nanovoids can take the form of a variety of shapes (e.g. lines, circles, ovals, rectangles, curved lines, curved shapes, crosses, etc.). The shape of each nanovoid defines the resonance character of that nanovoid, which in turn converts incident electromagnetic radiation phase and magnitude as desired according to a given technological application). These shapes are milled into an ultra-thin metallic film, which is capable of conducting clouds of electrons called plasmons thus creating a plasmonic resonance. The shapes are designed by simulating each kind of nano-antenna individually using full-wave, three-dimensional, finite element method calculations. FIG. 1 shows the phase shift ranging from 0 to 7π/4 within the visible range depending on the nano-antenna design. The complementary, or Babinet-inverted, design, increases the ratio of the transmitted power of useful, focused cross-polarized light ($P_s$) to the transmitted power of background, co-polarized scattered light ($P_n$). This increase in ratio is equivalent to increasing the overall signal-to-noise ratio (SNR=10 $\log_{10}$(Ps/Pn) dB) of the design. In essence, the SNR in the present design is quite similar to the polarization extinction ratio often used to characterize 90 degree phase plates. The presently claimed design efficiently prevents the transmission of the co-polarized component because the rest of the sample is opaque. The SNR in the design is estimated using two-dimensional arrays in the simulation. For a reasonable periodicity of 300 nm in both the x- and y-directions, the SNR for the original metallic nano-antenna design at 1.5 μm is about −14 dB. In contrast, for the currently claimed Babinet-inverted design at 676 nm, the SNR is about −3 dB, which is 11 dB higher.

Figure 2:
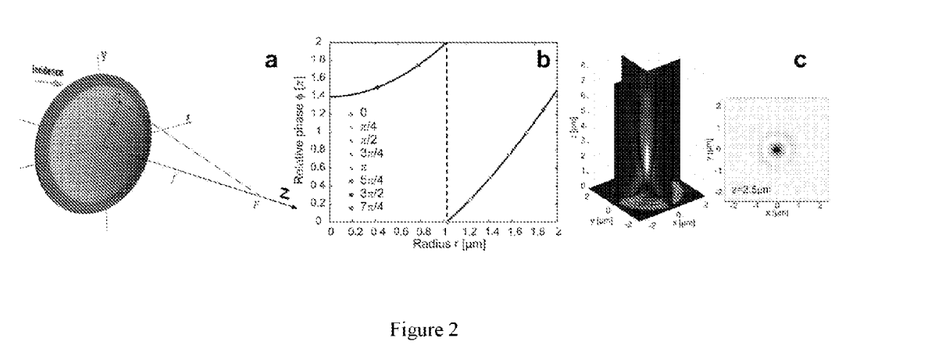
FIG. 2 shows an example design principle of the presently claimed invention. (a) An illustration of the complementary nano-antennas forming a circular metadevice—in this case a metalens—in a plane which focuses light at a focal point, F. P is an arbitrary individual nano-antenna at radius r which contributes to the light convergence. All light scattered by such nano-antennas should have constructive interference at the focal point, F. (b) The solid curve shows the required phase change at the surface dependent on the distance to the center of the device, and the plotted points show the phase that can actually be provided by the presently designed complementary plasmonic nano-antennas. Each individual plotted point indicates the phase change provided by each different design (from left to right: $3\pi/2$, $7\pi/2$, 0, $\pi/4$, $\pi/2$, 3π/4, π, 5π/4). (c) The intensity profile of the cross-polarized scattered light at the transmission side of sample A (See Table 1). The data are obtained from the full-wave FEM simulations (left panel of FIG. 2(c)). Pseudo-color E-field intensity maps depicted on two orthogonal cross-section planes (the xz- and yz-planes). Both planes intersect at the optical axis of the metalens (right panel of FIG. 2(c)).

The Babinet-inverted nano-antennas, or nanovoids, are further arranged in desired arrays, or patterns, (one example is illustrated in FIG. 2a, but the pattern, as depicted, need not be circular, concentric, or symmetrical). The array or pattern of all nanovoids in a given metadevice will ultimately be determined by the desired phase and magnitude change within each individual nanovoid. This change is defined by the size, shape, and location of each individual nanovoid of the given metadevice. The nanovoids of different shapes and sizes are distributed in such a way that the individual, discrete phase and magnitude shifts created by each nanovoid element cause the overall incoming cross-polarized wave front scattered at the interface to focus at a focal distance, f. The design of a given metadevice is obtained through the reciprocity principle, i.e., by reverse-propagating the light from a point source located at the focal point back to the device plane. Therefore, the required relative phase shift, φ, for a nano-antenna located at a distance of r from the center is calculated by:

$\varphi(r) = (2\pi\sqrt{(r^2+f^2)})/\lambda$, where $\lambda$ is the wavelength of the incident light in free space.

For example, the relationship between φ and r is plotted in FIG. 2b, for a metadevice (in this example, a focusing lens) with a focal length of f=2.5 mm and an operational wavelength of λ=676 nm (see sample A in Table 1). The solid line is the required phase shift wrapped by 2π, and the plotted points indicate the phase shifts provided by the nanovoids.

The specific shape of each nanovoid that is milled into the metal film plays the important function of converting the phase and magnitude of the electromagnetic radiation (e.g. light) which enters the hole. This is possible because the specific, or individual, resonance characteristics of each nanovoid are determined and defined by the shape of the nanovoid. And in combination with the plasmonic resonance occurring along and within each nanovoid, the radiation signal entering each hole is able to propagate along and through the nanovoid until emitted from the other side in a different phase and with a different magnitude. As each shaped nanovoid of the milled pattern performs its individual function, the total outcoming, or exiting, radiation forms a desired image at a focal length of micrometer-scale or less. This image, for example, can be in the form of a focused point due to conversion of incoming radiation, as illustrated by the Figures herein, or as a hologram, formed by diffracting incoming electromagnetic radiation using similar principles.

As stated, the presently claimed metadevices and method can be utilized not only for focusing electromagnetic radiation, but also for diffracting it in order to create a holographic image on the order of micrometers (i.e. a meta-hologram, or MH). Complex holograms can be produced by using the presently claimed metadevices to modulate both amplitudes and phases of incoming radiation. The produced MH features include high-resolution and low noise in comparison with the current state of the art. It should be noted that theoretical studies have been performed on phase-only holograms consisting of plasmonic antennas operating in the near infrared and created using the weighted Gerchberg-Saxton algorithm. Other non-resonant plasmonic structures have also been exploited to make conventional binary holograms for generating radially polarized optical beams. The presently claimed metadevices and method, at least with regard to the formation of meta-holograms, are advantageous in terms of demonstrated flexibility of phase/amplitude control, compactness, SNR, and image resolution. Each MH-nanovoid only takes 150×150 nm$^2$ area, the smallest pixel size currently achievable in this discrete type of hologram. Also, the presently claimed metadevices and method works on both transmission and reflection with the same design. Such meta-holograms can be utilized, for example, in more compact, efficient, and versatile optical components of planar optics, conformal nanophotonics, and display devices.

For purposes of a more demonstrative example, one embodiment of the presently claim invention is now described. This example applies the principles disclosed herein to form a metadevice in the form of a focusing lens, i.e. a metalens. It should be noted that experiments have equally and similarly been performed on metadevices for creating meta-holograms (MHs) of diffracted radiation. The following example illustrates how one potential array of nanovoids can be applied to modify the phase and magnitude of incoming electromagnetic radiation to create a focused point.

Figure 3:
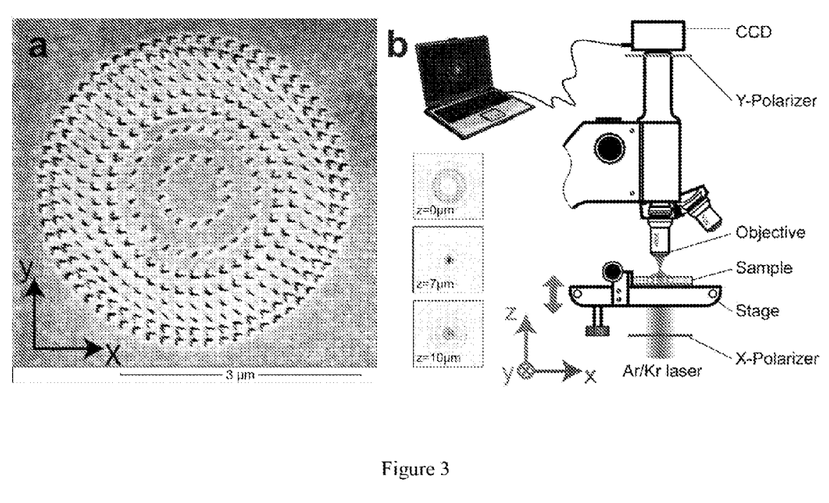
FIG. 3 shows (a) an FE SEM (field emission scanning electron microscopy) image of a fabricated planar plasmonic metalens with a focal length of 2.5 μm at an operational wavelength of 676 nm (sample A in the table below); and (b) a schematic of the experimental setup for measuring the light intensity distribution through a metalens sample on the transmission side.

In one embodiment of the present invention, the nanovoids are milled, or perforated, into a 30-nm-thick gold film using a focused ion beam. Although gold is used in this embodiment, it should be noted that other potential film materials include, but are not limited to, aluminum, silver, silicon carbide, graphene, and other paritonic material. The initial metal film is deposited on a glass substrate with electron-beam vapor deposition. Three different metadevice designs are fabricated on the same glass substrate to facilitate characterization. The parameters for three possible designs are shown in Table 1 below. FIG. 3a shows a field emission scanning electron microscopy image of sample A. Note that the focal lengths are designed for a wavelength of 676 nm, and the thicknesses of the samples are only about 1/22 of the operational wavelength. It will be understood that this is not an exhaustive list of potential designs, and that a plurality of designs of arrays or patterns are possible based on the desired technological application.

TABLE 1

Design parameters of fabricated metadevice samples.

| Sample | A | B | C |
| --- | --- | --- | --- |
| Focal length at 676 nm f (μm) | 2.5 | 5 | 7 |
| Radius r (μm) | 2 | 3.5 | 4.7 |
| Numerical aperture (NA) at 676 nm | 0.62 | 0.57 | 0.56 |
| Number of nanovoids | 349 | 1067 | 1768 |

The schematic of the experimental setup is shown in FIG. 3b and can be further described as follows. The cross-polarized light intensity is measured using a conventional optical microscope with a 100× objective device (Numerical aperture=0.75, Working distance=0.98 mm) on the transmission side. The stage resolution along the vertical direction (z-axis) is 0.5 μm, and the depth of focus of the optical system is approximately 0.5 μm, which is sufficient for the necessary measurements.

The sample under test is mounted on the microscope stage with the metadevice side up. The sample is then illuminated from the substrate side with a linearly polarized Ar/Kr laser in CW mode. Uniform illumination is ensured by using an incident beam diameter that is orders of magnitude larger than the diameter of a given device under test. The transmission images from the samples are recorded by a CCD camera. A pair of perpendicular polarizers is placed in the path, one before the sample and the second before the CCD camera, to ensure that only cross-polarized light is collected in the measurement and to eliminate any possible co-polarized background light. As the full-wave simulations of the actual devices (with experimentally-fit geometries and material constants) prove, the metadevices do not produce any significant cross-polarized stray light; for that reason, there is almost no light capable of distorting the intensity profiles obtained by this device.

By changing the height of the stage in increments of 0.5 µm, one can obtain the intensity distribution at different distances from the surface of the metadevice on the transmission side. The focal point of the objective device and the surface of the sample are coincident at z=0, and (x, y)=(0, 0) is the center of the metadevice. The insets in FIG. 3b show the CCD images obtained from sample C at different heights with 676-nm incident light. From the CCD images, three-dimensional intensity distribution profiles of the cross-polarized light are reconstructed.

In order to verify the experimental results, the analytical model for two-dimensional diffraction devices is extended to three-dimensional space. In the model, each nanovoid is represented as a point source emitting light with a phase corresponding to that scattered by the nanovoid. The electric field from a point source is proportional to the Green's function in three-dimensional space, and the overall profile of a device is then just the superposition of the electric field from the various electric point sources. It should be noted that only the cross-polarized component is considered in the model. More details about the model are presented elsewhere herein.

Figure 4:
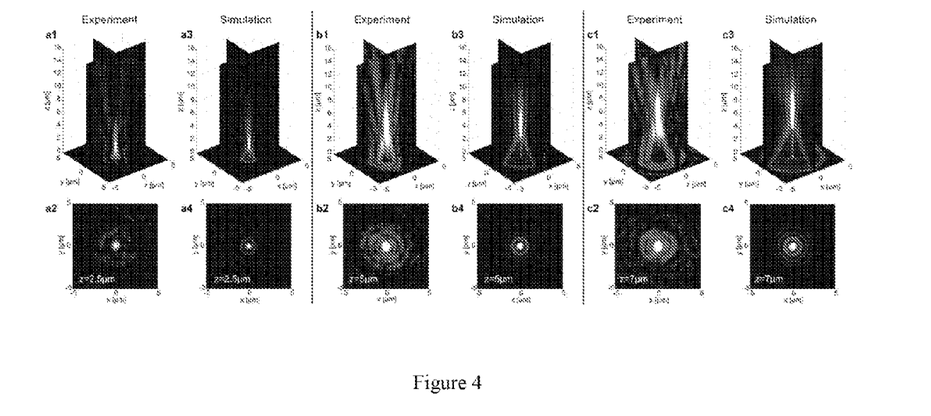
FIG. 4 shows the comparison between the experimentally-measured and simulated results for three different metalens designs (see Table 1 below) at a wavelength of 676 nm: (a) Results for sample A designed for a focal length of 2.5 μm. (b) Results for sample B designed for a focal length of 5 μm. (c) Results for sample C designed for a focal length of 7 μm. (a1), (a2), (b1), (b2), (c1), and (c2) each display a reconstructed cross-polarized light intensity distribution on the transmission side of each respective metalens design as derived from experimental measurements; (a3), (a4), (b3), (b4), (c3), and (c4) each display the simulated results for the same designs; (a1), (a3), (b1), (b3), (c1), and (c3) each correspond to intensity distributions for two cross-sectional planes cutting through the center of each metalens; and (a2), (a4), (b2), (b4), (c2), and (c4) each correspond to intensity distribution at the respective focal planes (a: z=2.5 μm, b: z=5 μm, c: z=7 μm). The x-y planes in (a1), (b1), and (c1) are at z=0 μm. The x-y planes in (a3), (b3), and (c3) are at z=0.1 μm (avoiding the singularity at z=0 μm in the simulations).

FIG. 4 shows the reconstructed light intensity distributions for cross-polarized light at 676 nm through three different metadevice samples on the transmission side. The pseudo-color field maps obtained from simulations and measurements for each design are plotted side by side for comparison. Light is strongly focused at the expected position for each design. At their focal planes, the diameters of the focused light spot are approximately on the scale of the operational wavelength (i.e. much smaller than one micrometer).

In prior studies, it has been shown that nano-antennas function well in a relatively wide wavelength range for incident monochromatic light without losing their ability to change the phase of the cross-polarized scattered light (See Ni, X., Emani, N. K., Kildishev, A. V., Boltasseva, A., Shalaev, V. M., "Broadband light bending with plasmonic nanoantennas", Science 2012; 335: 427). The present disclosure demonstrates the chromatic "tunability" of nanoantennas in the sense that the device focuses or diffracts different wavelengths at different positions. For conventional lens devices with their typically large, macroscopic focal lengths, this effect is called chromatic aberration (CA) and is usually considered a drawback. In the presently claimed metadevices, with their ultra-short focal lengths on the order of a few micrometers, the absolute shift is comparable to the focal distance itself.

Figure 5:
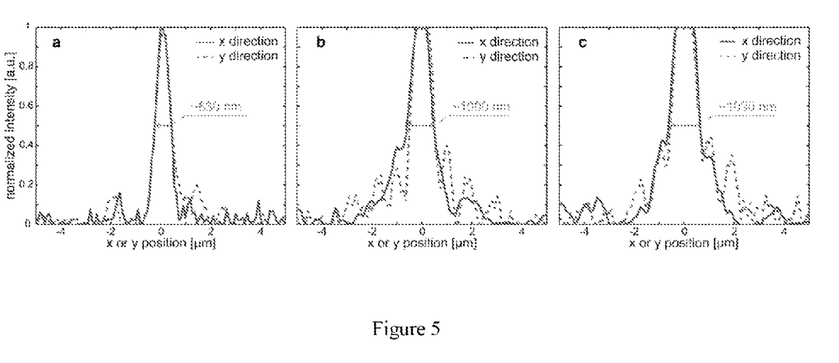
FIG. 5 shows the measured cross-polarized light intensity distribution on the focal plane for (a) sample A, (b) sample B, and (c) sample C along the y=0 (solid curves) and x=0 (dashed curves) axes. The intensity distribution is normalized to the maximum intensity point in each curve. The retrieved FWHM (full width at half maximum) for each sample is noted in the plots. There are flat peaks in (b) and (c) because the intensity is so large in the center of the focus that it is out of the CCD response range. Thus, the actual FWHM values will be smaller than those given in this figure.
Figure 6:
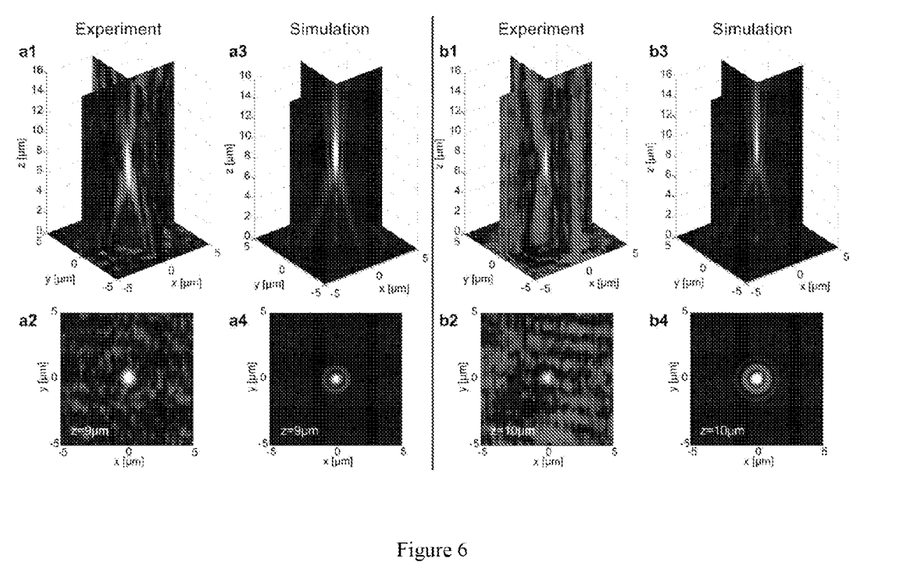

To evaluate the extraordinary large CA of the presently claimed metadevices and method, additional experimental measurements have been conducted at incident wavelengths of 531 nm and 476 nm for sample C. As shown in FIG. 5, the metadevice still has a tight light-focusing capability at these additional wavelengths. The background noise level is higher in the shorter wavelengths because the gold film is more transparent in that range. This can be overcome by using a thicker film or a material that is more metallic in that spectral range, such as silver or aluminum. The measured intensity distributions qualitatively match the simulated profiles. The focal length is shifted to 9.1 µm and 10.3 µm at 531 nm and 476 nm, respectively. Such an effect or feature leads to a method of controlling the focal length of a metadevice by adjusting the incident light wavelength within the entire visible spectrum. By comparing the calculated focal shift of an equivalent, conventional dielectric device with the shift obtained from the presently disclosed metadevice experiments, it can be concluded that the wavelength-tunable shift in metadevices could be at least an order of magnitude higher than that in an equivalent conventional dielectric lens device (note that the Fresnel zone plates have the same large CA as the metadevices). While it is hard to have such dynamic control with conventional dielectric lens devices because the effect is rather small there, the extraordinarily large CA from the presently claimed metadevices open up new and useful opportunities for various novel applications.

Because of the specific symmetry of the nanovoid building blocks in one embodiment of the present invention as depicted in the Figures (the last four nano-antennas are identical to the first four nano-antennas upon 90 degree clockwise rotation), changing the linear polarization of the incident light from x-polarized to y-polarized creates just an additional π phase shift of the cross-polarized scattered light. This would be equivalent to exchanging the first four nanoantennas with the last four (ring 1, i.e. the most inner ring, exchanged with ring 5, i.e. fifth ring from the center, ring 2 exchanged with ring 6, and so on). Therefore, the performance of the metadevices does not suffer due to such a change in polarization (which has been experimentally verified).

Thus, the present disclosure demonstrates x-/y-polarization-independent, ultra-thin and planar metadevices with extraordinarily strong focusing or diffracting abilities such that the focal spot sizes are larger but still comparable to the wavelength. The devices are comprised of arrays or patterns of plasmonic nano-antennas (nano-voids) milled, or perforated, in a 30-nm-thick gold film. The nano-voids provide discrete phase shifts ranging from 0 to 2π for cross-polarized scattered light. The Babinet-inverted design greatly increases the signal-to-noise ratio to typically more than 20 (twenty) times higher than that of previous metallic nano-antenna designs. A particular operational wavelength for the presently claimed metadevices can be chosen within the entire visible spectral range. This type of metadevice is extremely small (a few micrometers in size) and thin (much smaller than the wavelength of the incident light), and it is easy to design the focal length to be on the order of the operational wavelength. For example, f=2.5 µm is achieved experimentally with a 4-µm-diameter metadevice.

Also demonstrated is a wavelength-controllable focal length using one specific metadevice sample; as the presently claimed devices exhibit an extraordinarily large chromatic aberration in comparison with conventional devices, the optical characterization of this sample confirms that switching the incident wavelength from 676 to 476 nm changes the focal length from 7 µm to 10.3 µm. Thus, such devices can spatially separate light at different wavelengths within small, micrometer-scale areas.

In addition to providing planar, ultra-thin devices, this disclosure also expands the functional space of metadevices by turning them into easy-to-tune elements of future photonics.

All of these features are advantageous for fabricating on-chip or fiber-embedded optical devices, including nanophotonic couplers, ultra-thin and large-numerical-aperture objectives, and micrometer-scale light concentrators. The disclosed designs also work for two-orthogonal, linear polarizations of incident light. Furthermore, the disclosed designs also can be used to produce holograms through diffraction of incoming radiation via similar principles.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

In wave optics and acoustics, a phase front is the locus of points characterized by propagation of positions of identical phase. For a light wave, the phase front is represented as a surface of identical phase that can be modified with a conventional optical device. With our metasurface we can modify an incoming phasefront by changing the phases of the emergent light locally at predefined locations of the metasurface-based optical device, in one or more embodiments. Thus, for an illuminated metasurface, each nanovoid perforated in the film acts as a point source of emergent light with a given phase and intensity, according to one or more embodiments. In various embodiments, when the emergent light starts to propagate from the metasurface, each coherent point source interferes with each other at the imaging plane, resulting in a desired image—a combination of amplitudes and phases. Thus, it is the distribution of nanovoids with designer shapes and dimensions that defines the desired image, according to at least one embodiment. For a holographic device, such a distribution can form a visible holographic image of a given object. For the case of a flat lens, it provides either collimation or focusing of an incident light beam.

We claim:

1. A planar plasmonic device for arbitrary waveform formation, comprising:
a plurality of nanovoids perforated in a subwavelength-thick film, wherein said nanovoids form a pattern, and wherein a shape of each nanovoid provides a change of phase and magnitude of an incoming radiation due to plasmonic resonance of the radiation coupled to this nanovoid, wherein the shape of each nanovoid is configured to provide individual resonance characteristics, wherein the shape of the each nanovoid of the plurality of nanovoids is configured to provide a given phase front of outcoming radiation which is combined from portions of radiation exiting all nanovoids in said film, wherein a distribution of the plurality of nanovoids are configured to form a visible holographic image of an object.

2. The device of claim 1, wherein each nanovoid is in the form of a v-shape.

3. The device of claim 1, wherein each nanovoid is in the form of a curved shape.

4. The device of claim 1, wherein each nanovoid is in the form of a linear shape.

5. The device of claim 1, wherein said subwavelength-thick film comprises a gold film.

6. The device of claim 1, wherein said subwavelength-thick film comprises an aluminum film.

7. The device of claim 1, wherein said subwavelength-thick film comprises a silver film.

8. The device of claim 1, wherein said subwavelength-thick film comprises a single layer or multilayer graphene.

9. The device of claim 1, wherein said subwavelength-thick film comprises silicon carbide.

10. The device of claim 1, wherein the outcoming radiation forms a waveform similar to an output of a conventional lens.

11. The device of claim 10, wherein the device is operating as a focusing lens, and a focal length of the lens is controlled by adjustment of a wavelength of the incident light.

12. The device of claim 11, wherein the focal length of the device is in the order of one micrometer.

13. The device of claim 1, wherein said subwavelength-thick film comprises a polaritonic material.

14. A method for converting a phase and an intensity of incoming radiation for arbitrary waveform formation, comprising:
perforating a pattern of a plurality of nanovoids in a subwavelength-thick film, wherein said pattern comprises nanovoids of varying shapes corresponding to desired resonance characteristics that incoming radiation experiences during propagation through said nanovoid;
inputting radiation on said film with said pattern of nanovoids, wherein the radiation propagates through each individual nanovoid due to a plasmonic resonance within and along each nanovoid; and
producing an outcoming desired phase front of said radiation, wherein the resonance characteristics of each specifically-shaped nanovoid converts the phase and the magnitude of said incoming radiation into a desired outcoming phase front, wherein a distribution of the plurality of nanovoids are configured to form a visible holographic image of an object.

15. The method of claim 14, wherein the film is from 10 to 50 nm thick.

16. The method of claim 14, wherein a phase shift introduced by i-th nanovoid is the following: $\varphi(r_i)=(2\pi\sqrt{(r_i^2+f^2)})/\lambda$, where $\lambda$, is the wavelength of the incident light in free space, and $r_i$ is a distance of r from the center of the film.

17. The method of claim 14, wherein each nanovoid is in the form of a v-shape.

18. The method of claim 14, wherein each nanovoid is in the form of a curved shape.

19. The method of claim 14, wherein each nanovoid is in the form of a linear shape.

20. The method of claim 14, wherein said subwavelength-thick film comprises a gold film.

21. The method of claim 14, wherein said subwavelength-thick film comprises a single layer or multilayer graphene.

* * * * *